(12) United States Patent
Wang

(10) Patent No.: US 6,701,394 B2
(45) Date of Patent: Mar. 2, 2004

(54) INFORMATION EXCHANGING DEVICE FOR USE WITH HANDY PERSONAL INFORMATION PROCESSING DEVICE

(75) Inventor: Jong-Ding Wang, Taipei (TW)

(73) Assignee: Primax Electronics Ltd. (TW)

( * ) Notice: Subject to any disclaimer, the term of this patent is extended or adjusted under 35 U.S.C. 154(b) by 296 days.

(21) Appl. No.: 09/870,603

(22) Filed: May 30, 2001

(65) Prior Publication Data

US 2002/0116558 A1 Aug. 22, 2002

(30) Foreign Application Priority Data

Feb. 20, 2001 (TW) .................................... 90103841 A

(51) Int. Cl.⁷ ............................................. G06F 13/14
(52) U.S. Cl. .................... 710/62; 713/300; 320/115; 439/131; 361/686
(58) Field of Search .......................... 710/62; 320/115; 439/131; 361/686; 713/300

(56) References Cited

U.S. PATENT DOCUMENTS 6,049,453 A * 4/2000 Hulsebosch ................. 361/686
6,309,230 B2 * 10/2001 Helot ........................... 439/131
6,357,011 B2 * 3/2002 Gilbert ......................... 713/300
6,518,724 B2 * 2/2003 Janik ........................... 320/115

* cited by examiner

*Primary Examiner*—Kim Huynh
*Assistant Examiner*—Abdelmoniem Elamin
(74) *Attorney, Agent, or Firm*—Peter F. Corless; Steven M. Jensen; Edwards & Angell, LLP

(57) ABSTRACT

An information exchanging device is disclosed. The information exchanging device includes two separate but engagable housings which are mounted thereon two connectors for electrically connecting to two handy personal information processing devices such as PDAs or cellular phones, respectively. The two connectors are electrically connected to each other via an information exchanging circuit after the two housings engages with each other. The information exchanging circuit can be further connected to a personal computer. The information exchanging operation between the two handy personal information processing devices is performed in response to a triggering signal generated by pressing an actuating button or manipulating the personal computer.

29 Claims, 5 Drawing Sheets

INFORMATION EXCHANGING DEVICE FOR USE WITH HANDY PERSONAL INFORMATION PROCESSING DEVICE

FIELD OF THE INVENTION

The present invention relates to an information exchanging device, and more particularly to an information exchange device adapted to exchange information between two handy personal information processing devices.

BACKGROUND OF THE INVENTION

Due to the rapid development of manufacturing techniques, handy personal information processing devices can be made light, thin, compact and neat so as to become more and more popular and important in our daily lives. For example, cellular phones and personal digital assistants (PDAs) have become necessary communication tools for modern people.

The compact size of the handy personal information processing devices and thus their hardware input interfaces, on the other hand, render the input of information difficult. Therefore, it takes much time and effort to build and update a database such as a phone book or schedule. Especially for some people who own more than one handy personal information processing device, e.g. one cellular phone and one PDA, to solve this problem is even significant.

SUMMARY OF THE INVENTION

Therefore, an object of the present invention is to provide an information exchanging device, which allows two handy personal information processing devices to exchange information with each other by a simple operation.

A first aspect of the present invention relates to an information exchanging device for exchanging information between a first and a second handy personal information processing devices. The information exchanging device includes a first seat for supporting the first handy personal information processing device; a first connector positioned at the first seat for electrically connecting to the first handy personal information processing device; a second seat for supporting the second handy personal information processing device; a second connector positioned at the second seat for electrically connecting to the second handy personal information processing device; and an information exchanging circuit electrically connected between the first and second connectors for performing an information exchanging operation for the first and second handy personal information processing devices in response to a triggering signal.

Preferably, the information exchanging device further includes a charging device electrically connected to the first and second connectors for charging the first and second handy personal information processing devices.

The charging device may automatically charges the first and/or second handy personal information processing devices upon the first and/or second handy personal information processing devices are seated. Alternatively, a charging command may be given to perform the charging operation.

Preferably, the charging device includes a first charging circuit for charging the first handy personal information processing device, and a second charging circuit for charging the second handy personal information processing device.

Preferably, the first seat, first connector and first charging circuit are accommodated in a first housing, and the second seat, second connector and second charging circuit are accommodated in a second housing separable from the first housing.

More preferably, the second charging circuit is electrically connected to the first charging circuit when the first and second housings engage with each other, and one of the first and second charging circuits is connected to a power source.

In an embodiment, the information exchanging circuit includes a first sub-circuit accommodated in the first housing and a second sub-circuit accommodated in the second housing, which are connected to each other when the first and second housings engage with each other in order to perform the information exchanging operation. The triggering signal is generated by pressing an actuating button on one of the first and second housings after the engagement of the first and second housings.

In an embodiment, the information exchanging circuit includes a micro-controller. A signal transmission cable is electrically connected between a personal computer and the micro-controller. The information exchanging operation includes steps of exchanging information between the first handy personal information processing device and the personal computer, and exchanging information between the second handy personal information processing device and the personal computer. Preferably, the information exchanging operation further includes a step of exchanging information between the first handy personal information processing device and the personal computer again. In this embodiment, the triggering signal may be generated from the personal computer.

The first and second handy personal information processing devices may be cellular phones and/or personal digital assistants (PDAs).

Preferably, each of the first and second seats are in a slot form.

According to a second aspect of the present invention, an information exchanging device for exchanging information between a first and a second handy personal information processing devices includes a first connector for electrically connecting to the first handy personal information processing device; a second connector for electrically connecting to the second handy personal information processing device; and an information exchanging circuit electrically connected between the first and second connectors for performing an information exchanging operation for the first and second handy personal information processing devices in response to a triggering signal.

A third aspect of the present invention relates to an information exchanging charger for charging a first and a second handy personal information processing devices, and optionally exchanging information between the first and second handy personal information processing devices. The information exchanging charger includes a first charging seat for receiving the first handy personal information processing device; a second charging seat for receiving the second handy personal information processing device; a charging circuit for charging the first and/or second handy personal information processing devices when the first and/or second handy personal information processing devices are seated; and an information exchanging circuit for exchanging information between the first and second handy personal information processing devices when both of the first and second handy personal information processing devices are seated.

Preferably, the charging circuit includes a first charging unit for charging the first handy personal information processing device, and a second charging unit for charging the second handy personal information processing device. The first charging seat and first charging unit are accommodated in a first housing, and the second charging seat and second charging unit are accommodated in a second housing separable from the first housing. The second charging unit is electrically connected to the first charging unit when the first and second housings engage with each other, and one of the first and second charging units is connected to a power source.

BRIEF DESCRIPTION OF THE DRAWINGS

The present invention may best be understood through the following description with reference to the accompanying drawings, in which:

FIGS. 1A and 1B are schematic diagrams respectively showing a preferred embodiment of the structure of an information exchanging device according to the present invention wherein FIG. 1A shows a separate state, and FIG. 1B shows a combined state;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
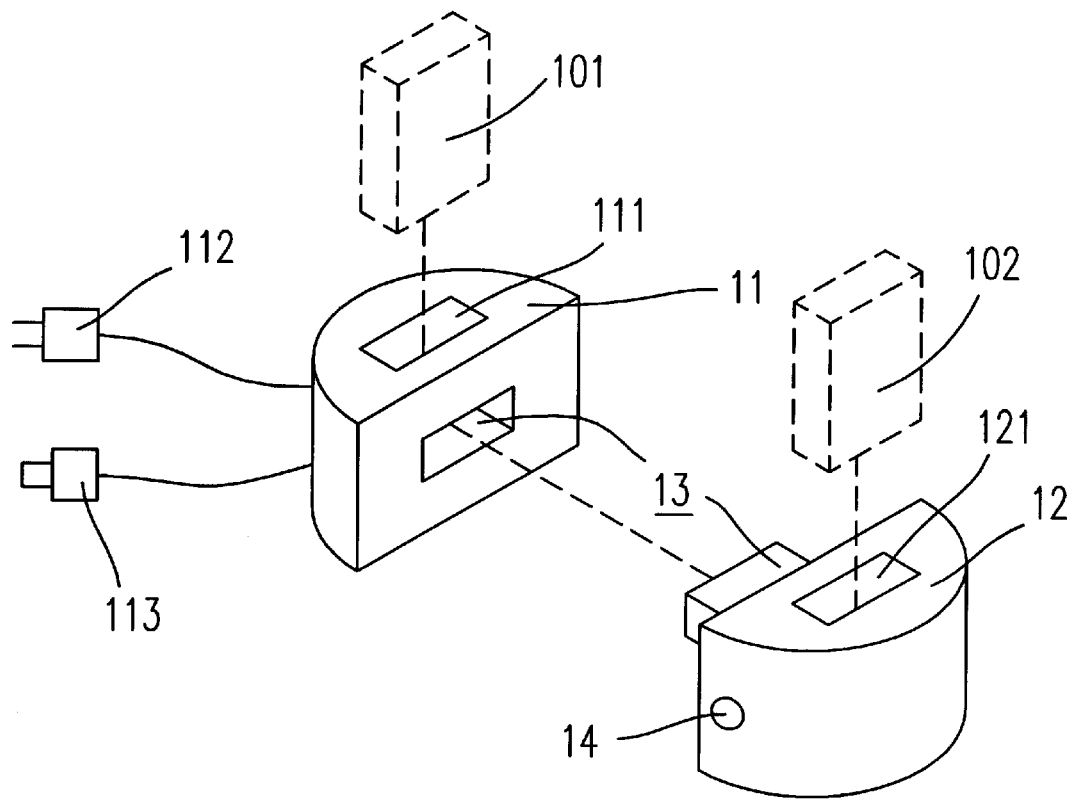

Please refer to FIG. 1A which schematically shows a preferred embodiment of the structure of an information exchanging device according to the present invention. The information exchanging device includes two separate but engageable housings 11 and 12. The housing 11 includes a slot 111 for receiving therein a first handy personal information processing device 101, e.g. a cellular phone, and the housing 12 includes a slot 121 for receiving therein a second handy personal information processing device 102, e.g. a PDA. The housings 11 and 12 can engage with each other via engaging members 13 so as to form an integral device, as show n in FIG. 1B. The information exchanging device is connected to a power source via a power cable 112 to obtain direct-current (DC) power, and optionally connected to a personal computer via a signal transmission cable 113, e.g. a universal serial bus (USB). When the cellular phone 101 and/or the PDA 102 are placed into the respective slots 111 and/or 121, they are automatically charged. When both of the cellular phone 101 and PDA 102 are placed into the respective slots 111 and 121, the housings 11 and 12 engage with each other, and an actuating button 14 is pressed, an information exchanging operation will be performed. In general, the information exchanging operation includes steps of selecting an information item, e.g. a phone book, to be renewed for both of the devices 101 and 102, converting the format of the information item into a proper form for renewing and exchanging, and storing the renewed information item. For example, the information exchanging operation can be performed by a micro-controller.

Figure 1B:
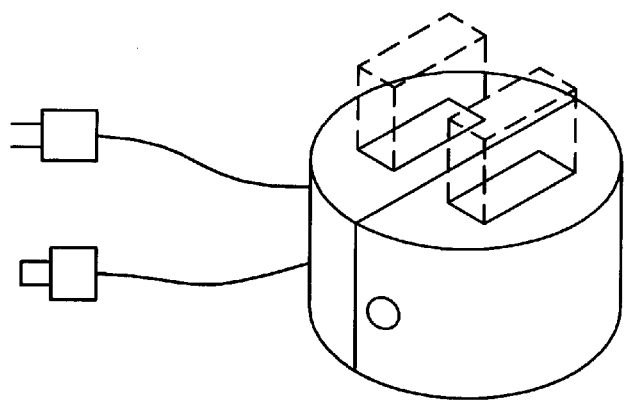
Figure 2A:
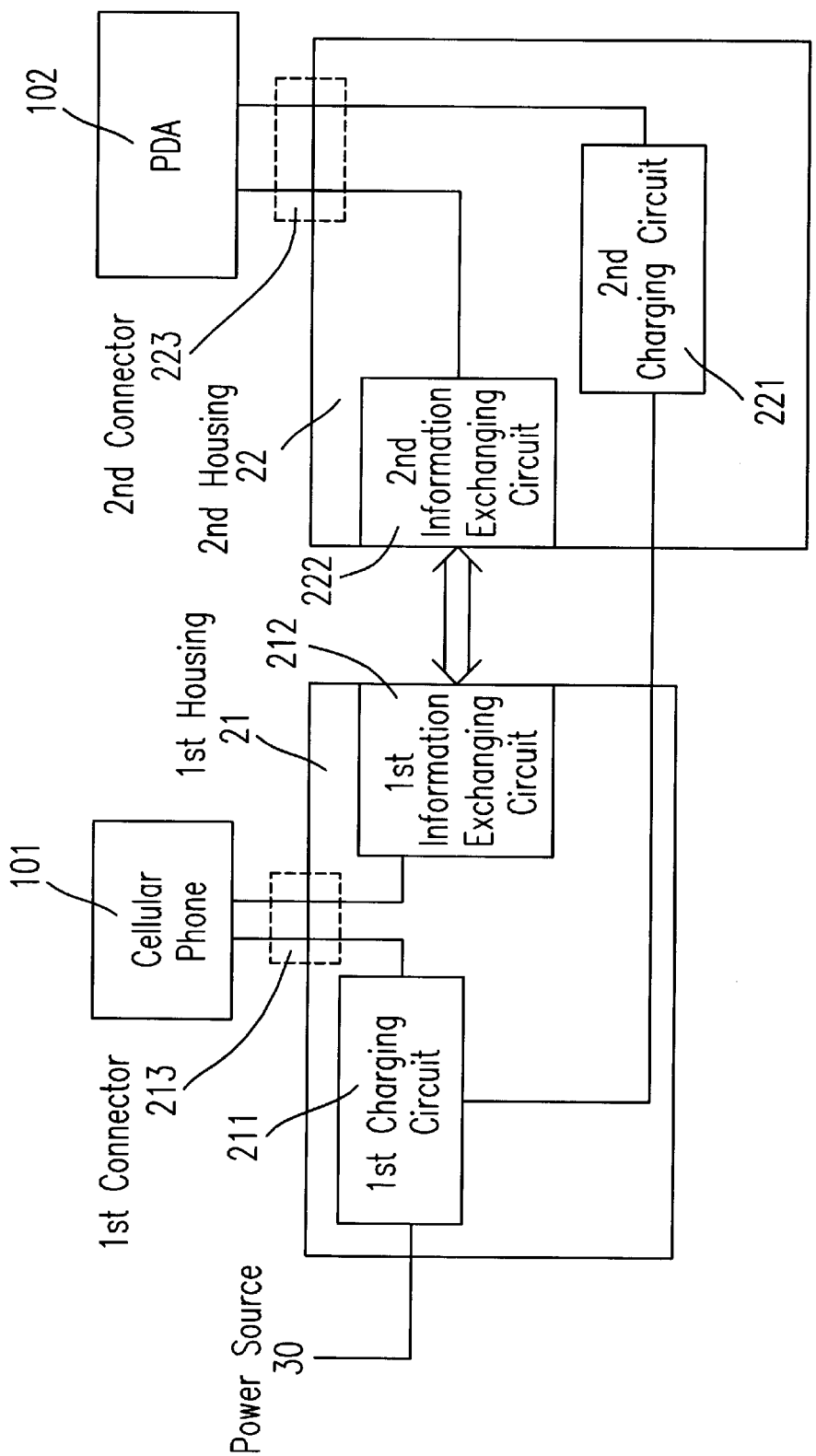
FIG. 2A is a schematic block diagram showing a first preferred embodiment of an information exchanging device according to the present invention.
Figure 2B:
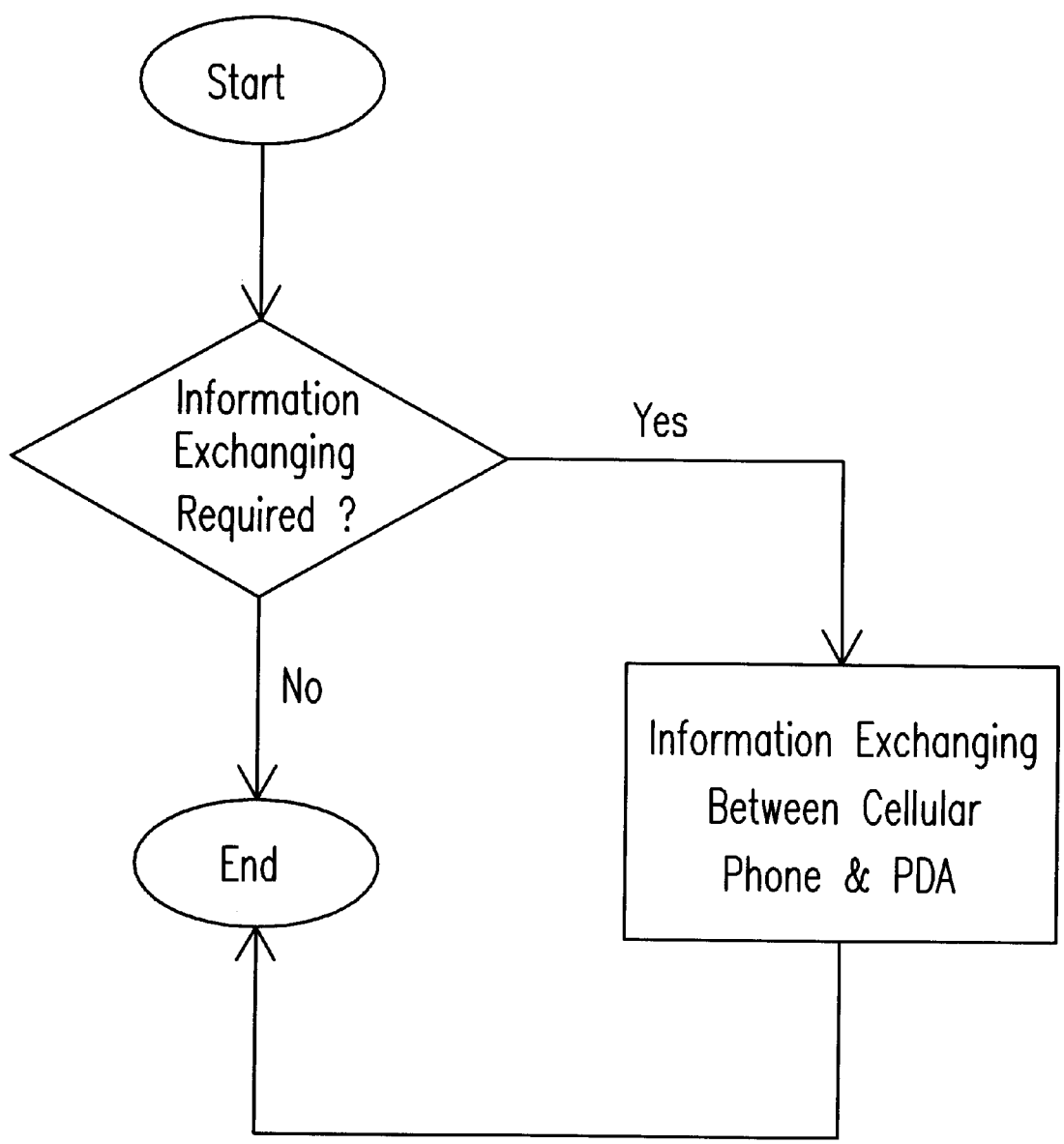
FIG. 2B is a flow chart exemplifying the operation of the information exchanging device of FIG. 2A.

Under the structure of FIGS. 1A and 1B, a schematic block diagram of a first preferred embodiment of an information exchanging device according to the present invention is shown in FIG. 2A. When the cellular phone 101 is seated into the slot 111, it is electrically connected to a first connector 213 positioned in the slot 111, and also electrically connected to a first charging circuit 211 and a first information exchanging circuit 212 via the first connector 213. Likewise, when the PDA 102 is seated into the slot 121, it is electrically connected to a second connector 223 positioned in the slot 121, and also electrically connected to a second charging circuit 221 and a second information exchanging circuit 222 via the second connector 223. By engaging the housing 11 with the housing 12, the second charging circuit 221 is electrically connected to the first charging circuit 211. The two charging circuits 211 and 221 obtain power from the power source 30 to charge the cellular phone 101 and the PDA 102, respectively. Also by engaging the housing 11 with the housing 12, the cellular phone 101 and the PDA 102 can communicate with each other via the first connector 213, the first information exchanging circuit 212, the second information exchanging circuit 222, and the second connector 223. Therefore, by pressing the button 14 to generate a triggering signal, the information exchanging operation between the cellular phone 101 and the PDA 102 can be performed. An example of the information exchanging operation is illustrated by a flowchart shown in FIG. 2B.

Figure 3A:
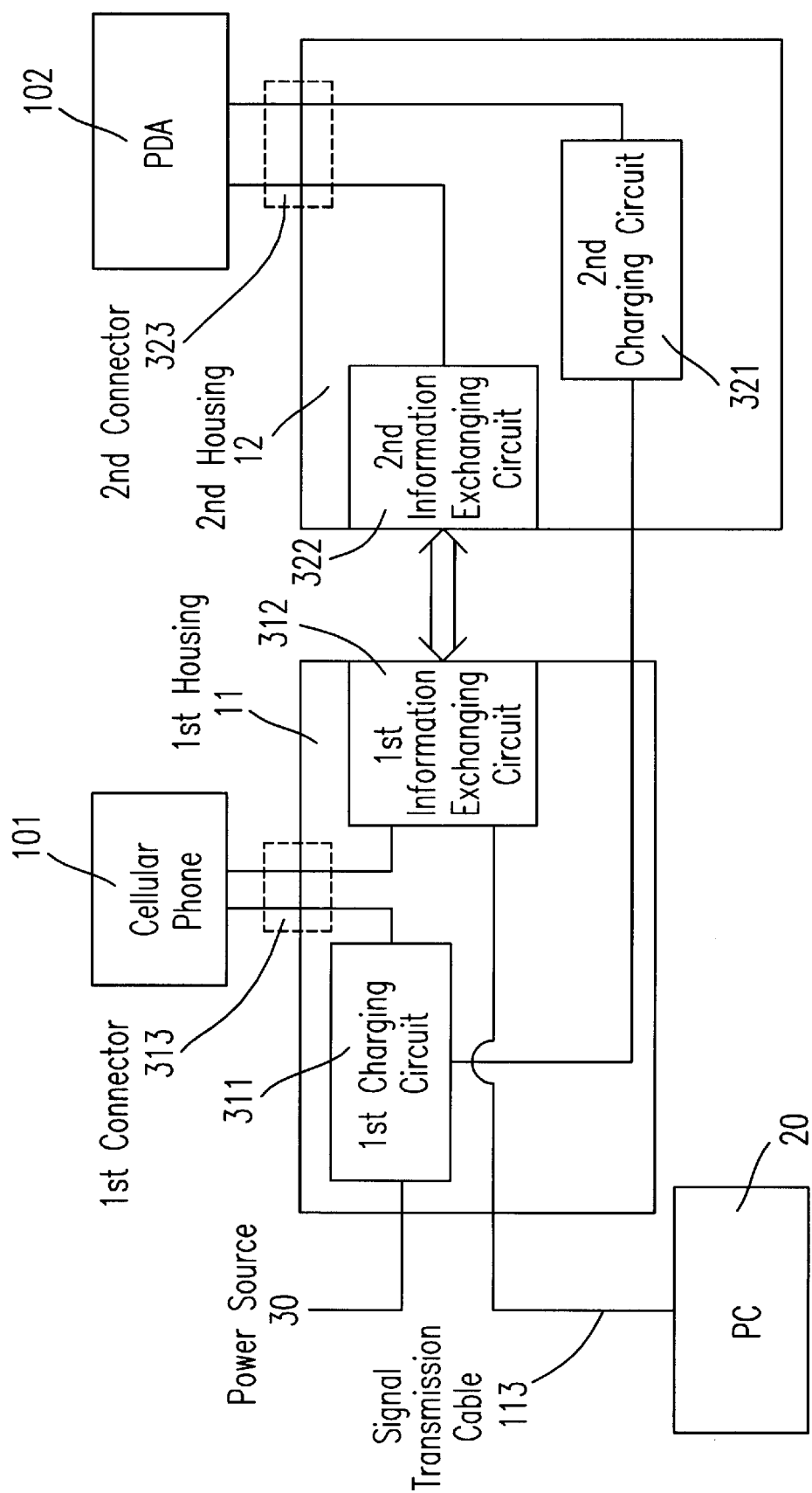
FIG. 3A is a schematic block diagram showing a second preferred embodiment of an information exchanging device according to the present invention.

A schematic block diagram of a second preferred embodiment of an information exchanging device according to the present invention is shown in FIG. 3A. The information exchanging device includes a first charging circuit 311, a first information exchanging circuit 312 and a first connector 313 interconnected as shown, and accommodated in the housing 11, and a second charging circuit 321, a second information exchanging circuit 322 and a second connector 323 interconnected as shown, and accommodated in the housing 12. Similar to the above embodiment, the first and second charging circuits 311 and 321 are electrically connected to the power source 30 to perform respective charging operations for the cellular phone 101 and the PDA 102 by engaging the two housings 11 and 12. Meanwhile, the first and second information exchanging circuits 321 and 322 are electrically connected to a personal computer 20 via a signal transmission cable 113.

Figure 3B:
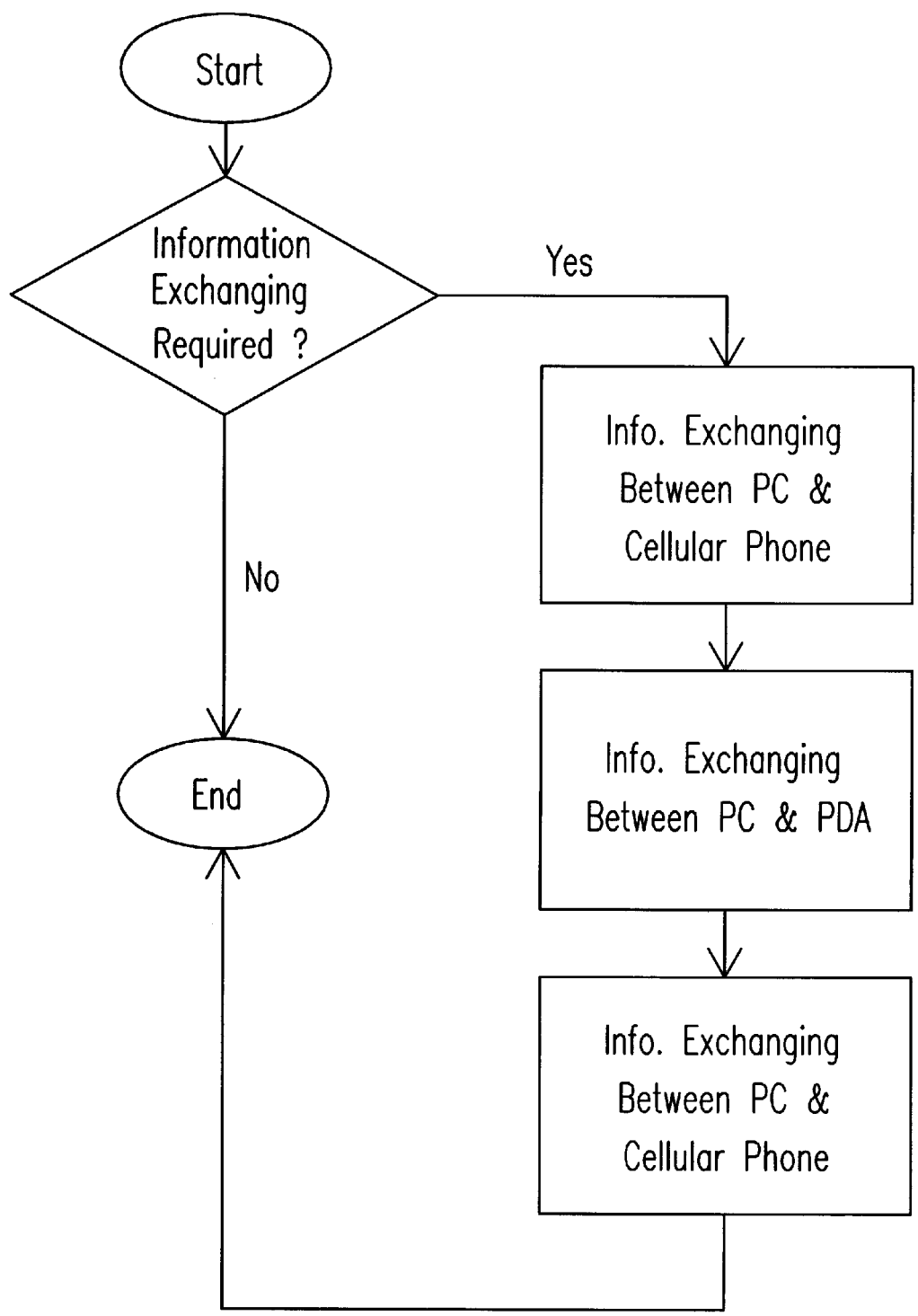
FIG. 3B is a flow chart exemplifying the operation of the information exchanging device of FIG. 3A.

The information exchanging operation of the device of FIG. 3A will be illustrated hereinafter with reference to FIG. 3B. When an information exchanging operation is required, the cellular phone 101 and the PDA 102 are inserted into respective slots 111 and 121 to be connected to the first and second connectors 313 and 323, respectively, and the two housings 11 and 12 engage with each other to allow the PC 20 to communicate with both of the cellular phone 101 and the PDA 102 via the first and second information exchanging circuits 321 and 322. First, the PC 20 exchanges information with, for example, the cellular phone 101 to synchronize the information in the PC with that in the cellular phone. Then, the PC 20 exchanges information with the PDA 102 to synchronize the renewed information in the PC with that in the PDA so that the PDA can have the latest information the same as the cellular phone via the PC. Again, the PC 20 exchanges information with the cellular phone 101 to synchronize the renewed information in the PC with that in the cellular phone so that the cellular phone can have the latest information the same as the PDA via the PC. In this way, the information exchanging operation between the cellular phone and the PDA can be completed.

It is understood that for various handy personal information processing devices, the connectors fitted thereto may vary. By producing the information exchanging device of the invention as two separate parts, the connectors of the two parts can be independently designed according to different handy personal information processing devices.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An information exchanging device for exchanging information between a first and a second handy personal information processing devices, comprising:

a first seat for supporting said first handy personal information processing device;

a first connector positioned at said first seat for electrically connecting to said first handy personal information processing device;

a second seat for supporting said second handy personal information processing device;

a second connector positioned at said second seat for electrically connecting to said second handy personal information processing device; and a signal transmission cable positioned at one of said first seat and said second seat for electrically connecting an information exchanging circuit to a personal computer;

wherein the information exchanging circuit is electrically connected between said first and second connectors for performing an information exchanging operation for said first and second handy personal information processing devices in response to a triggering signal.

2. The information exchanging device according to claim 1 further comprising a charging device electrically connected to said first and second connectors for charging said first and second handy personal information processing devices.

3. The information exchanging device according to claim 2 wherein said charging device automatically charges said first and/or second handy personal information processing devices upon said first and/or second handy personal information processing devices are seated.

4. The information exchanging device according to claim 2 wherein said charging device includes a first charging circuit for charging said first handy personal information processing device, and a second charging circuit for charging said second handy personal information processing device.

5. The information exchanging device according to claim 4 wherein said first seat, first connector and first charging circuit are accommodated in a first housing, and said second seat, second connector and second charging circuit are accommodated in a second housing separable from said first housing.

6. The information exchanging device according to claim 5 wherein said second charging circuit is electrically connected to said first charging circuit when said first and second housings engage with each other, and one of said first and second charging circuits is connected to a power source.

7. The information exchanging device according to claim 1 wherein said first seat and first connector are accommodated in a first housing, and said second seat and second connector are accommodated in a second housing separable from said first housing.

8. The information exchanging device according to claim 7 wherein said information exchanging circuit includes a first sub-circuit accommodated in said first housing and a second sub-circuit accommodated in said second housing, which are connected to each other when said first and second housings engage with each other in order to perform said information exchanging operation.

9. The information exchanging device according to claim 8 wherein said triggering signal is generated by pressing an actuating button on one of said first and second housings after the engagement of said first and second housings.

10. The information exchanging device according to claim 1 wherein said information exchanging circuit includes a micro-controller.

11. The information exchanging device according to claim 1 wherein said information exchanging operation includes steps of exchanging information between said first handy personal information processing device and said personal computer, and exchanging information between said second handy personal information processing device and said personal computer.

12. The information exchanging device according to claim 11 wherein said information exchanging operation further includes a step of exchanging information between said first handy personal information processing device and said personal computer again after exchanging information between said second handy personal information processing device and said personal computer.

13. The information exchanging device according to claim 12 wherein said triggering signal is generated from said personal computer.

14. The information exchanging device according to claim 1 wherein each of said first and second handy personal information processing devices is selected from a group consisting of a cellular phone and a personal digital assistant (PDA).

15. The information exchanging device according to claim 1 wherein each of said first and second seats are in a slot form.

16. An information exchanging device for exchanging information between a first and a second handy personal information processing devices, comprising:

a first connector for electrically connecting to said first handy personal information processing device;

a second connector for electrically connecting to said second handy personal information processing device; and a signal transmission cable positioned at one of said first connector and said second connector for electrically connecting an information exchanging circuit to a personal computer;

wherein the information exchanging circuit is electrically connected between said first and second connectors for performing an information exchanging operation for said first and second handy personal information processing devices in response to a triggering signal.

17. The information exchanging device according to claim 16 further comprising a charging device electrically connected to said first and second connectors for charging said first and second handy personal information processing devices.

18. The information exchanging device according to claim 16 wherein said information exchanging circuit includes a micro-controller.

19. The information exchanging device according to claim 16 wherein said information exchanging operation includes steps of exchanging information between said first handy personal information processing device and said personal computer, and exchanging information between said second handy personal information processing device and said personal computer.

20. The information exchanging device according to claim 19 wherein said information exchanging operation further includes a step of exchanging information between said first handy personal information processing device and said personal computer again after exchanging information between said second handy personal information processing device and said personal computer.

21. The information exchanging device according to claim 16 wherein each of said first and second handy personal information processing devices is selected from a group consisting of a cellular phone and a personal digital assistant (PDA).

22. An information exchanging charger for charging a first and a second handy personal information processing devices, and optionally exchanging information between said first and second handy personal information processing devices, comprising:

a first charging seat for receiving said first handy personal information processing device;

a second charging seat for receiving said second handy personal information processing device;

a charging circuit for charging said first and/or second handy personal information processing devices when said first and/or second handy personal information processing devices are seated; and a sign transmission cable positioned at one of said first charging seat and said second charging seat for electrically connecting an information exchanging circuit to a personal computer;

the information exchanging circuit for exchanging information between said first and second handy personal information processing devices when both of said first and second handy personal information processing devices are seated.

23. The information exchanging charger according to claim 22 wherein said charging circuit includes a first charging unit for charging said first handy personal information processing device, and a second charging unit for charging said second handy personal information processing device.

24. The information exchanging charger according to claim 23 wherein said first charging seat and first charging unit are accommodated in a first housing, and said second charging seat and second charging unit are accommodated in a second housing separable from said first housing.

25. The information exchanging charger according to claim 24 wherein said second charging unit is electrically connected to said first charging unit when said first and second housings engage with each other, and one of said first and second charging units is connected to a power source.

26. The information exchanging charger according to claim 22 wherein said information exchanging circuit includes a micro-controller.

27. The information exchanging charger according to claim 22 wherein said information exchanging operation includes steps of exchanging information between said first handy personal information processing device and said personal computer, and exchanging information between said second handy personal information processing device and said personal computer.

28. The information exchanging charger according to claim 27 wherein said information exchanging operation further includes a step of exchanging information between said first handy personal information processing device and said personal computer again after exchanging information between said second handy personal information processing device and said personal computer.

29. The information exchanging charger according to claim 22 wherein each of said first and second handy personal information processing devices is selected from a group consisting of a cellular phone and a personal digital assistant (PDA).

* * * * *